United States Patent [19]
Van Horn

[11] 3,855,011
[45] Dec. 17, 1974

[54] METHOD FOR CONTROLLING HEAT EFFECT IN METAL CUTTING OPERATIONS

[75] Inventor: Charles A. Van Horn, Country Club Hills, Ill.

[73] Assignee: Chemetron Corporation, Chicago, Ill.

[22] Filed: Nov. 14, 1973

[21] Appl. No.: 415,839

Related U.S. Application Data

[62] Division of Ser. No. 211,217, Dec. 23, 1971, Pat. No. 3,815,883.

[52] U.S. Cl............................................. 148/9 R
[51] Int. Cl............................................. B23k 7/00
[58] Field of Search......... 148/9, 9.5, 9.6; 266/23 S, 266/23 T; 239/290, 128

[56] References Cited
UNITED STATES PATENTS

| | | | |
|---|---|---|---|
| 1,409,433 | 3/1922 | Wass et al............................ | 239/290 |
| 2,227,476 | 1/1941 | Williams et al....................... | 148/9 |
| 2,464,351 | 3/1949 | Shorter................................. | 148/9 |
| R21,897 | 9/1941 | Taylor.................................. | 266/23 T |

FOREIGN PATENTS OR APPLICATIONS 561,586  5/1944  Great Britain......................... 148/9

*Primary Examiner*—W. Stallard
*Attorney, Agent, or Firm*—Nicholas M. Esser

[57] ABSTRACT

In a metal cutting apparatus of the type which cuts the metal workpiece by directing a jet of cutting gas against a pre-heated portion of the workpiece, a combination of a cutting tip and a hollow conical coolant nozzle which discharges a swirling sheet of coolant is used to control the distortion and localized hardening of the work caused by the heat effect of the cutting operation.

3 Claims, 5 Drawing Figures

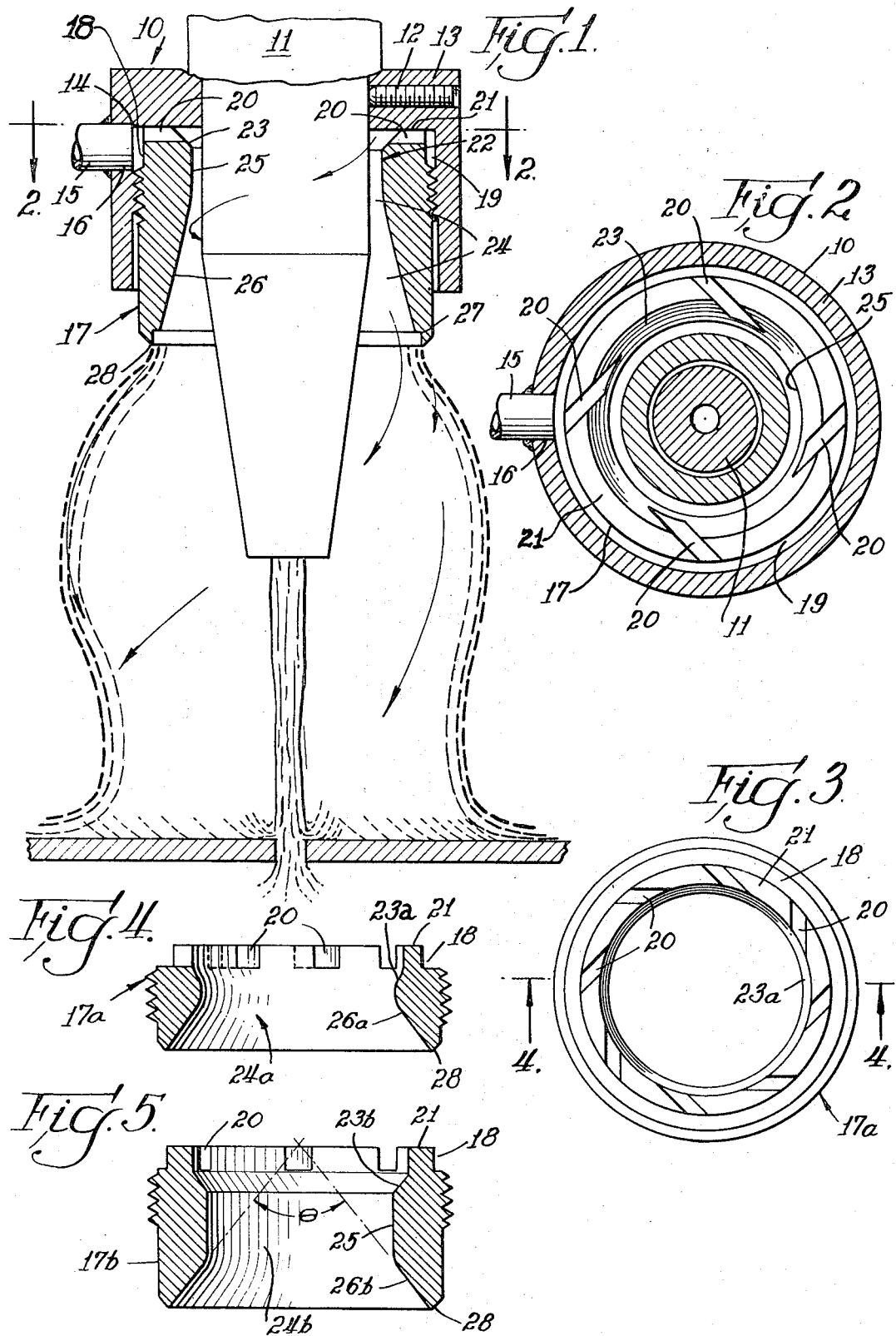

METHOD FOR CONTROLLING HEAT EFFECT IN METAL CUTTING OPERATIONS

This is a division of application Ser. No. 211,217 filed Dec. 23, 1971, now U.S. Pat. No. 3,815,883.

This invention relates to apparatus for and a method of cooling a metal workpiece being cut by a jet of gas directed against a pre-heated portion of the workpiece. The invention relates particularly to a combination of a coolant nozzle and a cutting tip adapted to pre-heat the metal workpiece and direct a jet of gas against the heated portion of the workpiece, and to a method employing this combination.

Cooling of the cut metal by means of the combination of this invention minimizes distortion of the metal workpiece which is caused ordinarily by the temperature difference between the metal near the cut and the more remote portions of the metal workpiece. A particular advantage of this invention lies in the superior degree of uniformity of hardness of the metal workpiece after being cut as compared to former methods of cooling the cut metal.

Known methods for cooling, and thereby controlling the distortion of a metal workpiece during a cutting operation, e.g. flame cutting, have lacked the capacity to cool the heavier plate thickness now being cut by high speed cutting machines. The method described in U.S. Pat. No. 2,208,121 employs an annular spray conduit which surrounds the cutting tip of the flame cutting apparatus. The spray conduit is perforated along the annular edge facing the workpiece. A coolant such as water is expressed through the perforations to direct a spray of the coolant against the workpiece. The spray consists of discrete streams of coolant which, for the most part, break up into droplets as they travel toward the workpiece. The coolant rebounds from the surface of the workpiece upon striking it and then settles as immobile pools. In the case of water, which is the usual coolant, the formation of a heat-insulating layer of steam under the immobile pools prevents the full utilization of the coolant's capacity to absorb heat.

The hardness of the cut edge of the metal workpiece when cooled by the method and the apparatus of this invention is demonstrably closer to the hardness of the remainder of the workpiece than that resulting from the cooling method employing a spray of coolant.

Other advantages gained by the use of the inventive method and apparatus include more effective entrapment of particulate matter ejected by the cutting gas then heretofore practicable and a lessened formation of adhesive slag.

One object of this invention, therefore, is to control or minimize the distortion of a metal workpiece as it is being cut by the impingement of a high velocity jet of gas against the heated surface of the workpiece. Another object is the minimization of hardness variations between heated and unheated portions of the metal workpiece. Still another object is the suppression of the clouds of metallic fines normally produced during the cutting operation. A further object is the lessened formation of adhesive slag. Another important object of the invention is the provision of a simple, rugged, convenient and easily maintained device for use as a cooling adjunct in a cutting apparatus.

In accordance with these objects, a method of cutting a metal workpiece has been discovered which comprises the steps of heating a portion of the metal workpiece to the red heat temperature of the metal, impinging a jet of cutting gas, usually an oxidizing gas such as high purity oxygen, against the pre-heated portion of the workpiece, generating a swirling annular sheet of coolant and directing said sheet of coolant onto the metal workpiece surrounding the point of impingement of the jet of gas. The sheet of coolant spreads outwardly over the surface of the workpiece as an intact film thereby controlling the heat effect of the cutting operation on the workpiece. The sheet of coolant differs from a spray in that a sheet has a continuous and intact surface whereas a spray is composed of droplets.

The heat effect includes distortion of the metal workpiece and hardness variations between the heated and unheated portions of the workpiece. The heat effect is particularly significant in the flame cutting of ferrous metals and the method of this invention is therefore especially useful in the flame cutting of such metals. Flame cutting commonly employs an oxy-acetylene or other oxy-fuel gas torch having a cutting tip which pre-heats the metal workpiece to an appropriate temperature and directs a jet of oxygen against the pre-heated metal to burn away the metal along the lines of impingement of the oxygen. The method may also be used in cutting operations wherein a jet of gas such as air, helium, nitrogen, argon and the like is used to cut molten metal from the workpiece by displacement. The air-carbon arc cutting of metals is an example. The invention will be described hereinafter with reference to flame cutting but it will be realized that it can be readily adapted to related types of cutting.

The annular sheet of coolant is generated by a hollow conical nozzle mounted about the cutting tip of a flame cutting torch. A swirling action imparted to the coolant by the shape of the nozzle, causing a sheet of coolant to emerge from the nozzle and impinge on the metal workpiece and spread outwardly over the workpiece as an intact film. The mobility of the intact film effects a vast improvement in the transfer of heat from the workpiece to the coolant as compared to the static pools of coolant which collect during the spraying of discrete streams of coolant onto the workpiece.

The invention will be better understood by reference to the accompanying drawing which illustrates a combination of a hollow conical coolant nozzle and a conventional flame cutting tip which may be used in practicing the inventive method.

FIG. 1 is an elevational view, partly in section, of the combination supported above a metal workpiece, depicting the action of a sheet or film of coolant having a continuous surface as it moves from a hollow conical nozzle toward the workpiece and spreads over it as an intact film. For clarity of illustration the coolant is not shown within the nozzle.

FIG. 2 is a sectional view of the combination taken along the line of 2—2 of FIG. 1.

FIG. 3 is a plan view of a nozzle insert used in an alternate embodiment of the hollow conical nozzle shown in FIGS. 1 and 2.

FIG. 4 is a sectional view taken along the line 4—4 of FIG. 3. FIG. 5 is a sectional view similar to that of FIG. 4 illustrating a nozzle insert used in another embodiment of the hollow conical nozzle shown in FIGS. 1 and 2.

In the combination shown in FIGS. 1 and 2, a hollow conical coolant nozzle 10 is mounted about a flame cutting tip 11 by means of a set-screw 12 or other mounting means. An annular nozzle body 13 is threaded to receive the set-screw 12. An annulus 14 in nozzle body 13 communicates with a coolant conduit 15 through an inlet port 16. Conduit 15 is connected to a source (not shown) of a liquid coolant, such as water, under pressure. A nozzle insert 17 is removably connected to nozzle body 13 by engagement of threads properly disposed in each. A peripheral groove 18 in nozzle insert 17 cooperates with annulus 14 in nozzle body 13 to form a plenum chamber 19. Alternatively, plenum chamber 19 may be formed by a recess in either the body or insert in cooperation with the wall of the other. Slots 20, preferably having walls 0.020 inch wide and 0.020 inch deep, are formed transversely in and cross upper annular surface 21 of insert 17 so that coolant passages between plenum chamber 19 and the interior insert 17 are formed in cooperation with the upper internal wall of nozzle body 13 adjacent thereto.

The contours of the interior surface 22 of insert 17 are such that it shapes and directs the stream of coolant flowing over it.

Interior surface 22 of insert 17 slopes inwardly at an angle of about 45° from upper surface 21 to form a vortex generating sloping surface 23 preferably about ⅛ inch wide. Annular cavity 24 through which the coolant swirls, is defined by nozzle throat wall 25 and skirt 26 and the external wall of cutting tip 11. Wall 25 defines a cylindrical section preferably about ⅛ inch in length and about ⅝ inch in diameter. Skirt 26 defines a frustoconical section having a base preferably about 29/32 inch in diameter and about ⅝ inch in length. The radius of curvature between nozzle throat wall 25 and skirt 26 is preferably about 0.060 inch. Skirt 26 terminates in an annular step 27 at its free end. The nozzle insert 17 at its outer surface is beveled at 28 providing a clean breakaway line for the sheet of coolant formed on surface 22.

In FIG. 2 slots 20 are substantially tangential to the vortex generating surface 23. A swirling action is thereby imparted to the coolant flowing onto vortex generating surface 23 from slots 20.

In FIG. 3 an alternate arrangement of eight slots 20 is illustrated. The thickness of the coolant sheet becomes more uniform as the number of slots 20 is increased.

In FIG. 4 vortex generating surface 23a slopes at an angel of about 46° from upper annular surface 21 toward skirt 26a. Cavity 24a is bounded by skirt 26a and is a frustoconical section. The radius of curvature between vortex generating surface 23a and skirt 26a is about 0.030 inch.

In FIG. 5 vortex generating surface 23b slopes at an angle of about 33° from upper surface 21 toward nozzle throat wall 25. The radius of curvature between throat wall 25 and skirt 26b is about 0.060 inch.

The angle of inclusion of a frustoconical section is illustrated in FIG. 5 as an angle $\theta$. This angle may be from about 15° to about 135° but angles from about 40° to about 120° are preferable. In FIG. 1, $\Theta$ is illustrated to be about 25°; in FIG. 4 about 70°; and in FIG. 5 about 75°.

An even number of slots 20 is illustrated in the drawing. However, it is only necessary that there be at least one coolant passage between plenum chamber 19 and the interior of nozzle 10. There may be from 1 to about 10 slots 20 in upper annular surface 21 or as many as are practicable.

Alternatively, a hollow conical nozzle having a inlet port adapted to direct a stream of coolant approximately tangentially onto a vortex generating surface may also be used in lieu of a nozzle having slots for coolant passages.

The walls of slots 20 form in transverse section three sides of a square, the fourth side being provided by the upper internal wall of nozzle body 13. The slots may also be of a rectangular, triangular or other suitable shape. Although 0.020 inch square is an adequate cross-sectional dimension of the slots, it is evident that the dimensions may be larger or smaller depending on other variables such as the number of slots, the coolant pressure and the diameter of the nozzle throat (the narrowest cross-section within sleeve member 17, 17a or 17b ), each of which affects the coolant velocity within the nozzle.

The annular cavity 24 provides sufficient clearance for the flow of the coolant through the nozzle.

The breakaway line of coolant nozzle 10 may be flush with the distal end of cutting tip 11 or as much as about 1 inch above it. The distance from the workpiece to the nozzle may be from about 0.25 inch to about 2 inches or more but from about 1 inch to about 2 inches is preferred. The swirling action of the coolant sheet is maintained over the intervening distance.

The annular sheet or film of coolant envelops an area on the workpiece of from about 1 inch to about 4 inches or more in diameter. The coolant does not appear to interfere with the preheating flame or the jet of oxidizing cutting gas with the operation of the flame cutting apparatus.

In operation of the combination of a hollow conical coolant nozzle 10 and a cutting tip 11, nozzle 10 in which angle $\Theta$ of nozzle insert 17 is about 49°, is mounted on cutting tip 11 which, in turn, is mounted on a flame cutting machine. A coolant such as water is made to flow under pressure through conduit 15 and inlet port 16 into plenum chamber 19 and then through slots 20 onto vortex generating surface 23. A swirling action is imparted to the coolant stream as it impinges on surface 23. The swirling water moves into annular cavity 24 and is formed into a sheet or film adhering closely to nozzle throat wall 25. The swirling sheet follows the contour of the curved surface between wall 25 and skirt 26, assuming a hollow frustum shape as it follows the latter. The significance of step 26 is not fully understood but it appears to cause the sheet of coolant to fan out into an inverted tulip-like shape as it travels toward the workpiece being cut. The integrity of the sheet or film of coolant is maintained as it strikes the metal workpiece and flows across the workpiece absorbing heat from the metal surrounding the point of cutting.

The action of hollow conical coolant nozzle 10 is believed to be based on the well known Coanda effect which includes the phenomenon of a sheet like stream or film of fluid (gaseous or liquid) attaching itself to a surface and following its contour even about rather sharp curves. An extreme instance of the Coanda effect is the bending of a stream of air around a 180° arc (Scientific American, Vol. 214, pages 84-92; June, 1966). One of the factors affecting the tendency of a fluid to adhere to the surface over which it is flowing is the radius of curvature of the surface. The radius of curvature of the contour between skirt 26 or 26b and throat wall 25 in nozzle insert 17 or 17b and between skirt 26a and vortex generating surface 23a in nozzle insert 17a is sufficient for the Coanda effect to be maintained.

The velocity of the coolant is another factor important to the operation of the Coanda effect. As noted above, the velocity is a function of the coolant pressure. A minimum pressure of 20 psi is necessary to maintain the sheet or film of coolant from nozzle insert 17. The maximum rate of discharge of water from nozzle insert 17 is about 0.5 gallon per minute. The water attains a velocity of about 6,000 feet per minute as it flows through slots 20 in nozzle insert 17 and onto vortex generating surface 23 at the maximum discharge rate.

It will be appreciated that other liquid coolants commonly used for controlling the heat effect during metal cutting may be used as well as water. The embodiments of the invention illustrated and described herein are merely illustrative and variations which may differ in detail but not in substance will readily suggest themselves to those skilled in the art.

What is claimed:

1. A method of cutting a metal workpiece comprising the steps of heating a portion of the metal workpiece, impinging a jet of gas on the heated portion, generating a swirling annular sheet or film of liquid coolant about the jet of gas and directing said sheet or film of coolant onto the metal workpiece about the locus of the impingement of the jet of gas, so that the sheet or film of coolant spreads intact outwardly over the surface of the metal workpiece.

2. The method of cliam 1 wherein the swirling annular sheet or film of coolant is generated at a distance of from about 0.25 to about 2 inches from the metal workpiece.

3. The method of claim 1 in which the annular sheet or film of coolant is directed onto the metal workpiece at a rate of about 0.5 gallon per minute.

* * * * *